US012363494B2

(12) United States Patent
Yamamoto

(10) Patent No.: US 12,363,494 B2
(45) Date of Patent: Jul. 15, 2025

(54) SIGNAL PROCESSING APPARATUS AND METHOD

(71) Applicant: SONY GROUP CORPORATION, Tokyo (JP)

(72) Inventor: Yuki Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 249 days.

(21) Appl. No.: 18/004,507

(22) PCT Filed: Jun. 30, 2021

(86) PCT No.: PCT/JP2021/024670
§ 371 (c)(1),
(2) Date: Jan. 6, 2023

(87) PCT Pub. No.: WO2022/014326
PCT Pub. Date: Jan. 20, 2022

(65) Prior Publication Data
US 2023/0254655 A1 Aug. 10, 2023

(30) Foreign Application Priority Data
Jul. 14, 2020 (JP) ................................ 2020-120707

(51) Int. Cl.
*H04S 7/00* (2006.01)
*G10L 19/008* (2013.01)
*H04S 1/00* (2006.01)

(52) U.S. Cl.
CPC ............ *H04S 7/302* (2013.01); *G10L 19/008* (2013.01); *H04S 1/007* (2013.01); *H04S 7/305* (2013.01); *H04S 2400/11* (2013.01)

(58) Field of Classification Search
CPC .......... H04S 7/302; H04S 1/007; H04S 7/305; H04S 2400/11; G10L 19/008; G10L 21/0272
(Continued)

(56) References Cited

U.S. PATENT DOCUMENTS 7,035,418 B1 * 4/2006 Okuno .................... H04N 7/15 348/E7.083
9,788,120 B2 * 10/2017 Miyasaka .............. H04S 7/308
(Continued)

FOREIGN PATENT DOCUMENTS

EP 3699905 A1 * 8/2020 ............ G10K 15/12
JP 2011-250100 A 12/2011
(Continued)

OTHER PUBLICATIONS

International Search Report and Written Opinion of PCT Application No. PCT/JP2021/024670, issued on Sep. 7, 2021, 12 pages of ISRWO.

(Continued)

*Primary Examiner* — Xu Mei
(74) *Attorney, Agent, or Firm* — CHIP LAW GROUP

(57) ABSTRACT

The present technology relates to signal processing apparatus and method which can perform audio reproduction with a realistic feeling. A signal processing apparatus includes a sound source separation unit that extracts, from an input audio signal including a plurality of sound source signals, one or a plurality of the sound source signals by sound source separation; a position information generation unit that generates position information of the extracted sound source signal on the basis of a result of the sound source separation; and an output unit that outputs the extracted
(Continued)

sound source signal and the position information as data of an audio object. The present technology can be applied to a signal processing apparatus.

14 Claims, 12 Drawing Sheets

(58) Field of Classification Search
USPC ..... 381/303, 94.1, 66; 700/94; 702/190, 191
See application file for complete search history.

(56) References Cited

U.S. PATENT DOCUMENTS

| | | | |
|---|---|---|---|
| 2007/0101249 A1 | 5/2007 | Lee et al. | |
| 2011/0144783 A1* | 6/2011 | Reichelt | H04S 7/30 700/94 |
| 2014/0133683 A1* | 5/2014 | Robinson | G10L 19/20 381/303 |
| 2017/0047076 A1* | 2/2017 | Shi | H04S 3/008 |
| 2019/0057715 A1 | 2/2019 | Saund et al. | |

FOREIGN PATENT DOCUMENTS

| | | | |
|---|---|---|---|
| JP | 2012-073088 A | | 4/2012 |
| JP | 2017-055149 A | | 3/2017 |
| JP | 2017-531213 A | | 10/2017 |
| WO | WO-2017043309 A1 | * | 3/2017 |
| WO | 2017/098949 A1 | | 6/2017 |
| WO | 2019/078035 A1 | | 4/2019 |

OTHER PUBLICATIONS

"Information technology—High efficiency coding and media delivery in heterogeneous environments", International Organization for Standardization/International Electrotechnical Commission ISO/IEC 23008-3, Part 3, 3D audio, Feb. 2019, 13 pages.

"Information technology—High efficiency coding and media delivery in heterogeneous environments", International Organization for Standardization/International Electrotechnical Commission ISO/IEC 23008-3:2015, Amendment 3, MPEG-H 3D Audio Phase 2, Jan. 10, 2017, 19 pages.

* cited by examiner

SIGNAL PROCESSING APPARATUS AND METHOD

CROSS REFERENCE TO RELATED APPLICATIONS

This application is a U.S. National Phase of International Patent Application No. PCT/JP2021/024670 filed on Jun. 30, 2021, which claims priority benefit of Japanese Patent Application No. JP 2020-120707 filed in the Japan Patent Office on Jul. 14, 2020. Each of the above-referenced applications is hereby incorporated herein by reference in its entirety.

TECHNICAL FIELD

The present technology relates to signal processing apparatus and method, and a program, and particularly relates to signal processing apparatus and method, and a program which can perform audio reproduction with a realistic feeling.

BACKGROUND ART

In the related art, a Moving Picture Experts Group (MPEG)-H 3D Audio standard is known (for example, refer to Non-Patent Document 1 and Non-Patent Document 2).

In 3D Audio handled in the MPEG-H 3D Audio standard or the like, it is possible to reproduce three-dimensional sound directions, distances, expansions, and the like, and audio reproduction with a more realistic feeling can be performed as compared with stereo reproduction in the related art.

CITATION LIST

Non-Patent Document

Non-Patent Document 1: ISO/IEC 23008-3, MPEG-H 3D Audio

Non-Patent Document 2: ISO/IEC 23008-3:2015/AMENDMENT3, MPEG-H 3D Audio Phase 2

SUMMARY OF THE INVENTION

Problems to be Solved by the Invention

However, in reproduction with 3D Audio, it is necessary that audio signals are separated for each sound source, that is, for each object, and position information is assigned to the objects.

Therefore, for example, an audio signal that is not separated for each object such as a stereo sound source already possessed by a user or an audio signal without position information cannot be reproduced by 3D Audio. That is, audio reproduction with a realistic feeling cannot be performed.

The present technology has been made in view of such a situation, and an object thereof is to enable audio reproduction with a realistic feeling.

Solutions to Problems

A signal processing apparatus according to an aspect of the present technology includes a sound source separation unit that extracts, from an input audio signal including a plurality of sound source signals, one or a plurality of the sound source signals by sound source separation; a position information generation unit that generates position information of the extracted sound source signal on the basis of a result of the sound source separation; and an output unit that outputs the extracted sound source signal and the position information as data of an audio object.

A signal processing method or a program according to another aspect of the present technology includes steps of extracting, from an input audio signal including a plurality of sound source signals, one or a plurality of the sound source signals by sound source separation; generating position information of the extracted sound source signal on the basis of a result of the sound source separation; and outputting the extracted sound source signal and the position information as data of an audio object.

In an aspect of the present technology, from an input audio signal including a plurality of sound source signals, one or a plurality of the sound source signals is extracted by sound source separation; position information of the extracted sound source signal is generated on the basis of a result of the sound source separation; and the extracted sound source signal and the position information are output as data of an audio object.

MODE FOR CARRYING OUT THE INVENTION

Hereinafter, embodiments to which the present technology is applied will be described with reference to the drawings.

First Embodiment

Configuration Example of Signal Processing Apparatus

The present technology separates an audio signal in which one or a plurality of sound sources is mixed into audio signals for respective sound sources (objects) by sound source separation, and assigns position information on the basis of a sound source separation result, thereby enabling reproduction with 3D Audio. Therefore, it is possible to perform audio reproduction with a more realistic feeling.

Particularly in the present technology, audio reproduction with a realistic feeling can be realized by using a sound source separation technology and a three-dimensional automatic arrangement technology in combination.

The sound source separation technology is a technology of separating an audio signal in which a plurality of sound sources is mixed into audio signals for respective sound sources. Furthermore, the three-dimensional automatic arrangement technology is a technology of automatically assigning position information to the audio signal for each sound source.

Hereinafter, a case where a stereo sound source already possessed by the user, that is, left and right two-channel audio signals are input will be specifically described. However, the present technology is not limited thereto, and the audio signal to be input may be a monaural audio signal or a multi-channel audio signal of three or more channels.

Figure 1:
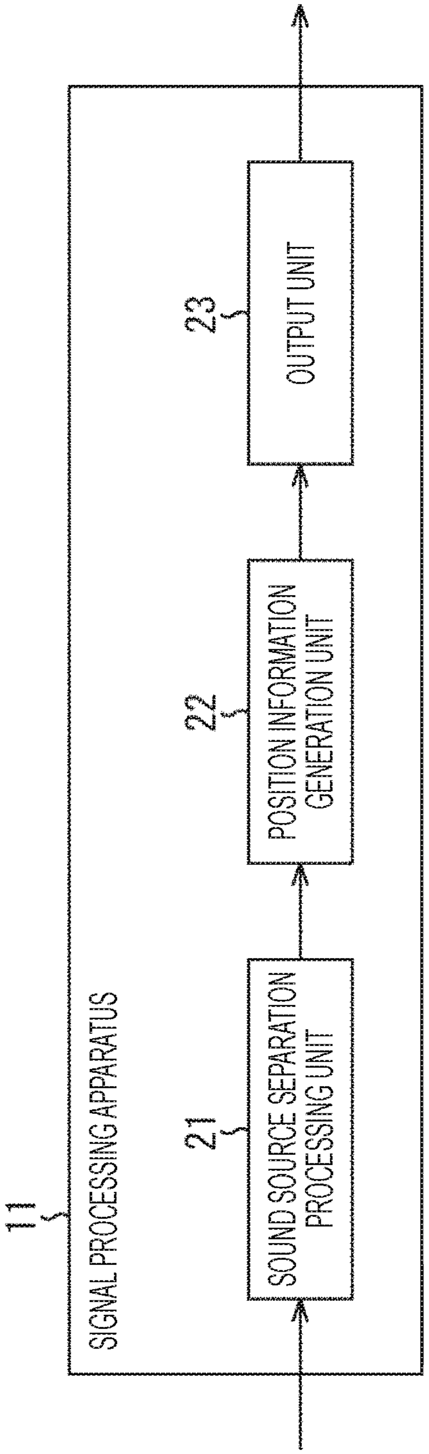
FIG. 1 is a diagram illustrating a configuration example of a signal processing apparatus.

FIG. 1 is a diagram illustrating a configuration example of an embodiment of the signal processing apparatus to which the present technology is applied.

A signal processing apparatus 11 illustrated in FIG. 1 includes a sound source separation processing unit 21, a position information generation unit 22, and an output unit 23.

Sound of one or a plurality of sound sources, that is, an audio signal such as stereo in which audio signals of one or a plurality of sound sources are mixed is supplied as an input audio signal to the sound source separation processing unit 21. The input audio signal is a signal for reproducing a predetermined audio content and the like.

The sound source separation processing unit 21 performs sound source separation on the supplied input audio signal, and supplies the sound source separation result to the position information generation unit 22.

For example, by performing the sound source separation, the audio signal for each of a plurality of sound sources is extracted (separated) from the input audio signal, and instrument information indicating a sound source type of the sound contained in the audio signals and channel information indicating the channel of the audio signal are obtained.

The sound source separation processing unit 21 supplies the audio signal for each sound source, the instrument information, and the channel information that are obtained in this manner, to the position information generation unit 22 as the sound source separation result. Note that, hereinafter, the audio signal for each sound source obtained by the sound source separation is also referred to as a sound source signal.

The position information generation unit 22 assigns the position information to each sound source signal on the basis of the sound source separation result supplied from the sound source separation processing unit 21, and supplies the sound source signal and the position information to the output unit 23. Note that the instrument information and the channel information of each sound source signal may also be supplied from the position information generation unit 22 to the output unit 23.

In the position information generation unit 22, the three-dimensional automatic arrangement technology is used to generate the position information of each sound source signal from the sound source signal, the instrument information, and the channel information as the sound source separation result.

Here, the position information of the sound source signal is information indicating the position of the sound source in the three-dimensional space, that is, a sound localization position of the sound of the sound source. This position information includes, for example, a radius indicating the distance from a reference position to the sound source, a horizontal angle indicating the position of the sound source in a horizontal direction, and a vertical angle indicating the position of the sound source in a vertical direction.

The output unit 23 generates object data which is data of the audio object on the basis of the sound source signal and the position information supplied from the position information generation unit 22, and outputs the object data.

For example, the output unit 23 uses one sound source signal as the audio signal of one object (audio object), and generates data including at least the position information of the sound source signal as metadata.

The output unit 23 outputs the data including the sound source signal and the metadata obtained for each object in this manner, as the object data. In other words, the sound source signal and the metadata of each object are output as the object data.

Note that not only the position information but also the instrument information and the channel information may be included in the metadata.

(Regarding Sound Source Separation Technology)

Next, the sound source separation technology used in the sound source separation processing unit 21 and the three-dimensional automatic arrangement technology used in the position information generation unit 22 will be described.

First, the sound source separation technology will be described.

For example, in a case where the sound source separation technology is applied to the stereo sound source, that is, two-channel audio signals of the L channel and the R channel, a plurality of two-channel audio signals separated for each sound source can be obtained as an output.

The sound source types and the number of sound source signals extracted by the sound source separation vary depending on the sound source separation technology, but here, it is assumed that the number of sound source types is four and sound source signals of two channels (stereo) of L and R are extracted for each sound source type.

Figure 2:
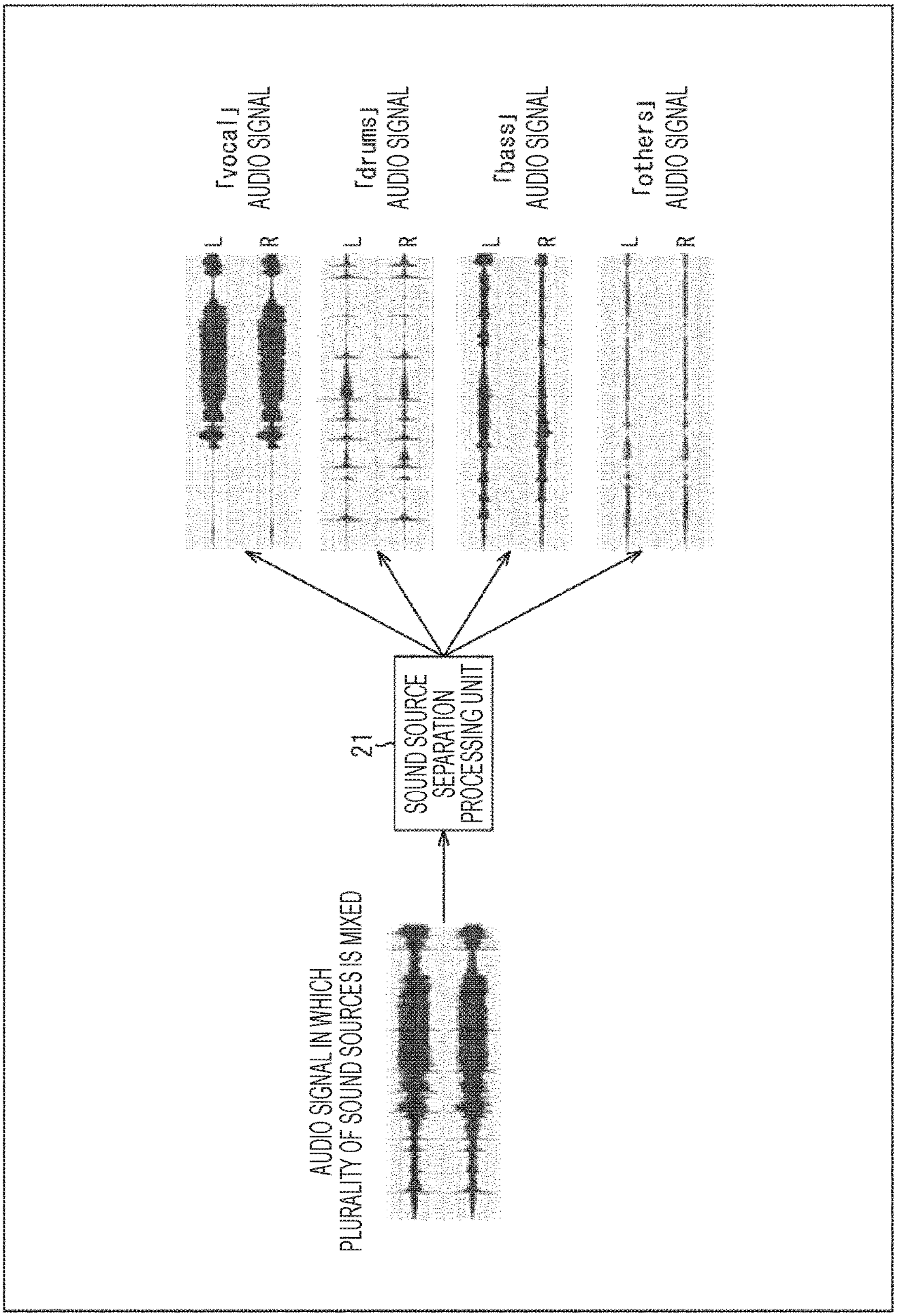
FIG. 2 is a diagram for describing sound source separation.

Specifically, in the following description, for example, as illustrated in FIG. 2, it is assumed that the sound source separation is performed to obtain the sound source signals of the sound of four types of sound source types "vocal", "drums", "bass", and "others".

Note that the sound source type "others" is a sound source other than "vocal", "drums", and "bass", and is, for example, a sound source such as "guitar" or "piano". The sound source signal to which the instrument information indicating the sound source type "others" is assigned includes a sound component of one or a plurality of sound sources other than "vocal", "drums", and "bass".

In the example illustrated in FIG. 2, as illustrated on the left side in the figure, a two-channel (stereo) input audio signal in which components of a plurality of sound sources are mixed is supplied to the sound source separation processing unit 21, and the sound source separation is performed on the input audio signal.

For example, the sound source separation is performed on the basis of a neural network generated in advance by learning, that is, parameters, such as coefficients, or the like that realize the neural network.

Specifically, the sound source separation processing unit 21 performs predetermined calculation on the basis of the parameters of the neural network and the input audio signal, and thereby extracts, from the input audio signal, the audio signal of each channel of predetermined four types of sound source types “vocal”, “drums”, “bass”, and “others” as the sound source signal.

Therefore, for example, eight sound source signals are obtained as illustrated on the right side in FIG. 2.

Specifically, the sound source signals of the L channel and the R channel of the sound source type “vocal”, the sound source signals of the L channel and the R channel of the sound source type “drums”, the sound source signals of the L channel and the R channel of the sound source type “bass”, and the sound source signals of the L channel and the R channel of the sound source type “others” are obtained.

Here, in the sound source separation in the sound source separation processing unit 21, it is assumed that, in a case where all the sound source signals after the sound source separation are added, the input audio signal is restored, that is, a signal that is exactly the same as the input audio signal is obtained.

Furthermore, here, a case where the stereo input audio signal is used as the input of the sound source separation, and the stereo sound source signal of each sound source is obtained as the output has been described.

However, the present technology is not limited thereto, and sound source separation may be performed in which a monaural or multi-channel input audio signal is used as the input of sound source separation, and a sound source signal having an arbitrary channel configuration such as monaural, stereo, or multi-channel is used as the output.

(Regarding Three-Dimensional Automatic Arrangement Technology)

Next, the three-dimensional automatic arrangement technology will be described.

For example, sound source signals of two channels of a plurality of sound source types are obtained by sound source separation, but in the position information generation unit 22, each of the sound source signals for each channel of each sound source type is regarded as a signal of one object, and the three-dimensional automatic arrangement technology is applied.

Here, the instrument information indicating the sound source type “vocal”, “drums”, or the like, and the channel information indicating the channel such as L or R are assigned to each sound source signal regarded as the object, by the sound source separation in the sound source separation processing unit 21.

In a case where the three-dimensional automatic arrangement technology is applied to the object (sound source signal) to which the instrument information and the channel information are assigned in this manner, the horizontal angle and the vertical angle indicating the position of each object in the three-dimensional space are automatically determined (assigned).

Note that, in the three-dimensional automatic arrangement technology, a radius of a predetermined value may be assigned as the radius indicating the position of the object, or a different radius may be assigned for each object.

As an application method of the three-dimensional automatic arrangement technology, two application methods are mainly considered. Hereinafter, these application methods will be described.

(Application Method M1 of Three-Dimensional Automatic Arrangement Technology)

First, in the first application method M1, the horizontal angle and the vertical angle constituting the position information of each object (sound source signal) are determined by a decision tree model obtained by learning in advance, on the basis of the instrument information and the channel information obtained as the sound source separation result.

In particular, here, learning is performed by limiting the instrument information as the input of the decision tree model to four types of “vocal”, “drums”, “bass”, and “others”.

At the time of learning of the decision tree model, the instrument information and the channel information for each object, which are collected for a plurality of pieces of 3D Audio content in advance, and the horizontal angle and the vertical angle as the position information are used as data for training (training data).

Then, learning of the decision tree model in which the instrument information and the channel information are used as the input and the horizontal angle and the vertical angle as the position information are used as the output is performed.

By using the decision tree model obtained in this manner, the position information of each sound source (object) can be easily determined (predicted).

For example, at the time of determining the position information by the decision tree model, the determination is continuously performed up to the end of the decision tree according to the result of the determination processing based on each piece of information such as the instrument information and the channel information, such as whether the instrument information is “vocal”, and the final horizontal angle and vertical angle are determined.

By using such a decision tree model, it is possible to determine the horizontal angle and the vertical angle constituting the metadata for each sound source, from the information assigned to each sound source (object) such as the instrument information and the channel information.

Note that, in the application method M1, since the instrument information and the channel information are not changed for the entire sound source signal, the position information determined for each sound source (object) is not changed for the entire sound source signal.

(Application Method M2 of Three-Dimensional Automatic Arrangement Technology)

Furthermore, in an application method M2 different from the application method M1 of the three-dimensional automatic arrangement technology, information other than the instrument information and the channel information assigned by the sound source separation is obtained by prediction, and the horizontal angle and the vertical angle are determined using these pieces of information as the input.

For example, reverberation information, acoustic information, priority information, and the like can be considered as the information associated with information regarding sound sources (objects) other than the instrument information and the channel information.

The reverberation information is information indicating a reverberation effect as an acoustic effect such as “dry” or “short reverb”, that is, a reverberation characteristic, among acoustic effects such as effects applied to the sound source signal.

Furthermore, the acoustic information is information indicating an acoustic effect other than the reverberation effect, such as “natural” or “dist”, among acoustic effects such as effects applied to the sound source signal.

Moreover, the priority information is information indicating the priority of the object.

Various methods can be considered as a method of predicting the reverberation information, the acoustic information, and the priority information for each object (sound source signal).

Here, as an example, it is assumed that a neural network that uses the sound source signal as the input and uses identification results of the reverberation information, the acoustic information, and the priority information for the sound source signal as the output is generated in advance by learning, and the neural network is used.

Furthermore, a decision tree model in which the reverberation information, the acoustic information, and the priority information, which are outputs of the neural network, and the instrument information and the channel information are used as the input, and the horizontal angle and the vertical angle as the position information are used as the output is also learned in advance.

Note that the input of the decision tree model may be only the reverberation information, the acoustic information, and the priority information.

In such an application method M2, for the sound source signal to be an input of the neural network, the reverberation information, the acoustic information, and the priority information are determined in units of time intervals such as 1024 samples of the sound source signal, that is, in units of frames.

Therefore, the position information can be obtained in units of frames by the decision tree model using the reverberation information and the acoustic information, which are changed in units of frames, as the input. That is, since the position information including the horizontal angle and the vertical angle output from the decision tree model can be changed with time, the object data of the dynamic object can be obtained.

Figure 3:
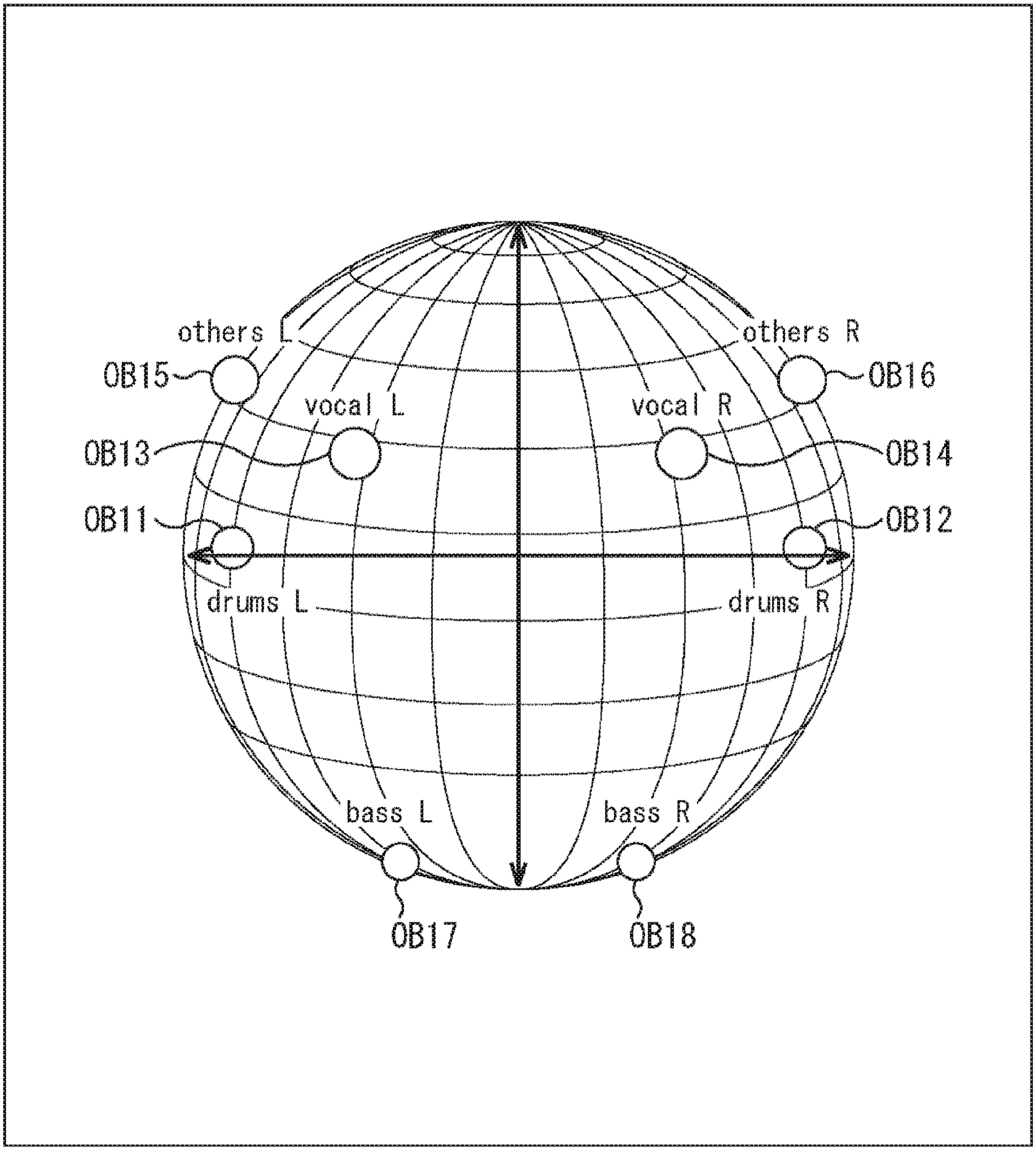
FIG. 3 is a diagram illustrating a sound source arrangement example in a three-dimensional space.

In a case where the position information is generated by the application method M1 and the application method M2 as described above, for example, each object (sound source) is arranged in a three-dimensional space as illustrated in FIG. 3.

FIG. 3 illustrates an example in which the sound source separation and the prediction of the position information described above are performed on the input audio signals illustrated in FIG. 2, and the objects are arranged at the positions indicated by the position information obtained as a result.

In particular, in FIG. 3, the depth direction indicates the front direction of a listener (user) who listens to the sound based on the input audio signal, and the upward, downward, left, and right directions in the drawing are upward, downward, left, and right directions as viewed from the listener.

In particular, here, the left direction as viewed from the listener, that is, the left direction in the drawing indicates a positive direction of the horizontal angle, and the right direction as viewed from the listener indicates a negative direction of the horizontal angle. Furthermore, the upward direction as viewed from the listener indicates a positive direction of the vertical angle, and the downward direction as viewed from the listener indicates a negative direction of the vertical angle.

In this example, for example, objects OB11 to OB18 of eight sound source signals are arranged in the three-dimensional space. In particular, here, a sound source signal of one channel of each piece of the instrument information is treated as a signal of one object.

The object OB11 and the object OB12 represent objects of the L channel and the R channel of the instrument information "drums", and the object OB13 and the object OB14 represent objects of the L channel and the R channel of the instrument information "vocal".

Furthermore, the object OB15 and the object OB16 represent objects of the L channel and the R channel of the instrument information "others", and the object OB17 and the object OB18 represent objects of the L channel and the R channel of the instrument information "bass".

Among these objects OB11 to OB18, the objects of the L channel are arranged on the left side as viewed from the listener, and the objects of the R channel are arranged on the right side as viewed from the listener. Furthermore, it can be seen that the objects having the same instrument information are arranged symmetrically when viewed from the listener at the same vertical angle.

As described above, in the application method M2, it is possible to determine appropriate horizontal angle and vertical angle according to the change in the sound source signal as compared with the application method M1.

Note that, for the object (sound source) to which the instrument information "others" is assigned, more detailed instrument information may be obtained by prediction, and the instrument information may be used as the input of the decision tree model.

In this case, for example, a neural network or the like in which the sound source signal is used as the input and the instrument information (sound source type) is used as the output may be learned in advance. Furthermore, in this case, the reverberation information, the acoustic information, the priority information, and the like obtained by the prediction may also be used for the prediction of the instrument information.

As described above, by predicting more detailed instrument information for the object of which the instrument information is "others", it is possible to determine appropriate horizontal angle and vertical angle according to the feature of the sound source signal as compared with the case where the instrument information "others" is used as it is.

Furthermore, for example, a neural network that uses the sound source signal as the input and uses identification results of the reverberation information, the acoustic information, and the priority information as the output, or a decision tree model that uses the reverberation information or the like as the input and uses the horizontal angle and the vertical angle as the position information as the output may be learned for each sound source type of the sound source signal, that is, for each piece of the instrument information.

Moreover, the position information may be generated by a different method for each sound source type. For example, the application method M1 and the application method M2 described above may be switched according to the instrument information or the like.

For example, the position information may be generated by the application method M1 for the sound source signals which are main sound source components of general content and of which the instrument information considered to be more stable in a case where the sound source position is not moved is "vocal", "drums", and "bass", and the position information may be generated by the application method M2 for the sound source signal of the instrument information "others".

In addition, a neural network or the like that uses the sound source signal itself, or the sound source signal and the instrument information or the channel information as the input and uses the horizontal angle and the vertical angle of the sound source (object) corresponding to the sound source signal as the output may be used for generating the position information.

As described above, by using the sound source separation technology and the three-dimensional automatic arrangement technology in combination, it is possible to obtain object data that can be reproduced by 3D Audio from the input audio signal such as a stereo sound source. In other words, 3D Audio reproduction can be performed even with the stereo sound source already possessed by the user or the like, and audio reproduction with a more realistic feeling can be realized.

As described above, the input audio signal is not limited to that of the stereo sound source, and may be an audio signal of a multi-channel sound source such as 5.1 ch or 7.1 ch, a mono sound source, or the like.

<Description of Object Data Generation Processing>

Subsequently, the operation of the signal processing apparatus 11 illustrated in FIG. 1 will be described in detail. That is, hereinafter, the object data generation processing by the signal processing apparatus 11 will be described with reference to the flowchart of FIG. 4.

In step S11, the sound source separation processing unit 21 performs sound source separation on the supplied input audio signal, and supplies the sound source separation result to the position information generation unit 22.

For example, in step S11, the input audio signal is input to the neural network obtained by learning in advance so that an operation is performed, and the sound source signal, the instrument information, and the channel information for each sound source (object) are obtained as a result of the sound source separation.

In step S12, the position information generation unit 22 performs automatic arrangement processing on the basis of the sound source separation result supplied from the sound source separation processing unit 21.

For example, in step S12, as the automatic arrangement processing, the processing of the application method M1 and the application method M2 described above is performed using the decision tree and the neural network obtained in advance by learning, and the position information of each object (sound source signal) is generated.

Specifically, for example, the position information generation unit 22 obtains the reverberation information, the acoustic information, and the priority information for the sound source signal by prediction on the basis of the sound source signal and the neural network obtained in advance by learning. Then, the position information generation unit 22 obtains the position information of the sound source (object) on the basis of the instrument information, the channel information, the reverberation information, the acoustic information, and the priority information obtained for the sound source signal, and the decision tree model obtained in advance by learning.

The position information generation unit 22 supplies the sound source signal and the position information obtained by the automatic arrangement processing to the output unit 23. At this time, the position information generation unit 22 also supplies the instrument information, the channel information, and the like to the output unit 23 as necessary.

In step S13, the output unit 23 generates and outputs the object data on the basis of the sound source signal and the position information supplied from the position information generation unit 22.

For example, the output unit 23 sets one sound source signal such as a sound source signal of the L channel of the instrument information "vocal" as a signal of one object, and generates data including the sound source signal of each object and metadata of each object including at least the position information, as the object data. At this time, for example, the metadata may include not only the position information but also the channel information, the instrument information, and the like.

In a case where the object data is generated in this manner, the output unit 23 outputs the object data to the subsequent stage, and the object data generation processing is ended.

As described above, by performing the sound source separation and the automatic arrangement processing in combination, the signal processing apparatus 11 generates and outputs the object data that can be reproduced by 3D Audio from the audio signal that cannot be reproduced by 3D Audio as it is such as a stereo sound source. In this manner, audio reproduction with a more realistic feeling can be performed.

Second Embodiment

<Application of Other Technologies>

By the way, as described in the first embodiment, by applying the sound source separation technology and the three-dimensional automatic arrangement technology, the input audio signal of a stereo sound source or the like can be reproduced by 3D Audio.

In addition to this, by applying the technology (processing) described below, sound quality at the time of 3D Audio reproduction can be improved.

Such a technology (processing) for improving sound quality is, for example, reduction processing of artificial noise and processing of expanding a sound image.

(Reduction Processing of Artificial Noise)

First, among the processing, the reduction processing of artificial noise will be described. This reduction processing of artificial noise is a technology of making it difficult to perceive artificial noise caused by the sound source separation, by the three-dimensional automatic arrangement of objects (sound sources).

In a case where the sound source separation is performed, artificial noise such as musical noise may be generated in the resulting audio signal, and the noise has two features F1 and F2 as follows.

(Feature F1)

As the number of sound sources included in the input audio signal is smaller, the noise after separation is more conspicuous.

(Feature F2)

Noise becomes less conspicuous as the arrangement positions of all the separated sound sources are brought closer.

For example, the artificial noise has the feature F1 because the human can easily perceive the noise as the number of sound sources is smaller.

Furthermore, in the sound source separation of the present technology, in a case where all the plurality of audio signals after the sound source separation is added, the original audio signal that is the input of the sound source separation is restored, and thus the artificial noise has the feature F2.

Therefore, by performing the processing described below as the reduction processing of artificial noise using these features, the artificial noise can be made difficult to perceive.

In the reduction processing of artificial noise, first, a sound pressure level($i_{obj}$) of each of the plurality of sound source signals after the separation is calculated by the following Formula (1).

[Formula 1]

$$\text{level}\ (i_{obj}) = 20 * \log_{10}\left(\frac{\sum_{i_{sample}=1}^{n_{sample}} pcm^2(i_{obj}, i_{sample})}{n_{sample}} + 2^{-23}\right) \quad (1)$$

In Formula (1), $i_{obj}$ represents an index of the sound source after the sound source separation, and $i_{sample}$ represents an index of a sample of the sound source signal.

Furthermore, pcm($i_{obj}$, $i_{sample}$) indicates a sample value of the $i_{sample}$-th sample of the sound source signal of the sound source of which the index is $i_{obj}$. Moreover, $n_{sample}$ indicates the total number of samples of the sound source signal.

Next, threshold processing based on a predetermined threshold value thre1 is performed on the sound pressure level($i_{obj}$) of each sound source signal, and the number of sound sources (sound source signals) of which the sound pressure level($i_{obj}$) is equal to or greater than the threshold value thre1 (hereinafter, also referred to as an effective sound source number) is counted.

Here, the threshold value thre1 is, for example, −70 dB or the like. In this example, the sound source signal of which the sound pressure level($i_{obj}$) is equal to or greater than the threshold value thre1 is assumed to be a signal substantially including a sound source component, and the effective sound source number indicating the number of sound source components substantially included in the input audio signal is obtained.

In a case where the effective sound source number is obtained in this manner, the effective sound source number is divided by the total number of sound sources, and the value of the division result is obtained as a sound source ratio.

Here, the total number of sound sources is the number of sound sources considered to be included in the input audio signal when the sound source separation is performed.

Specifically, in the example described above, the sound source signal for each stereo channel is extracted from the input audio signal by the sound source separation for each sound source type of "vocal", "drums", "bass", and "others", and thus, the total number of sound sources is eight in such an example.

Since the sound source ratio is a ratio between the effective sound source number and the total number of sound sources, the input sound source signal includes more sound source components as the effective sound source number is increased.

In the reduction processing of artificial noise, the sound source ratio obtained in this manner is compared with a predetermined threshold value thre2 determined in advance. Here, for example, the threshold value thre2 is set to 0.5 or the like.

Then, in a case where the sound source ratio is greater than the threshold value thre2, since the number of sound sources included in the input audio signal is sufficiently large, it is considered that the artificial noise of the sound source signal is inconspicuous, and thus the processing for reducing the artificial noise is not particularly performed.

On the other hand, for example, in a case where the sound source ratio is equal to or less than the threshold value thre2, in order to reduce the artificial noise using the feature F2 described above, the horizontal angles and the vertical angles of all the sound sources after the sound source separation are corrected by the following Formulas (2) to (5) according to the sound source ratio.

That is, in a case where the horizontal angle azimuth($i_{obj}$) indicated by the position information of the sound source (sound source signal) of which the index is $i_{obj}$ is 0 degrees or more, the horizontal angle is corrected as illustrated in Formula (2). Furthermore, in a case where the horizontal angle azimuth($i_{obj}$) is less than 0 degrees, the horizontal angle is corrected as illustrated in Formula (3).

[Formula 2]

$$\text{if azimuth}\ (i_{obj}) >= 0\text{: azimuth}_{new}\ (i_{obj}) = \text{azimuth}_{ref} + (\text{azimuth}\ (i_{obj}) - \text{azimuth}_{ref}) * \frac{\text{ratio}}{thre2} \quad (2)$$

[Formula 3]

$$\text{if azimuth}\ (i_{obj}) < 0\text{: azimuth}_{new}\ (i_{obj}) = -\text{azimuth}_{ref} + (\text{azimuth}\ (i_{obj}) + \text{azimuth}_{ref}) * \frac{\text{ratio}}{thre2} \quad (3)$$

Note that, in Formulas (2) and (3), azimuth($i_{obj}$) indicates the horizontal angle before correction of the sound source of which the index is $i_{obj}$, that is, the horizontal angle constituting the position information generated by the three-dimensional automatic arrangement technology in the position information generation unit 22.

Furthermore, $\text{azimuth}_{new}(i_{obj})$ indicates the corrected horizontal angle of the sound source of which the index is $i_{obj}$, that is, the horizontal angle obtained by correcting the horizontal angle azimuth($i_{obj}$).

Moreover, in Formulas (2) and (3), $\text{azimuth}_{ref}$ is a predetermined horizontal angle such as 30 degrees, for example.

Similarly to the horizontal angle, in a case where the vertical angle elevation($i_{obj}$) indicated by the position information of the sound source (sound source signal) of which the index is $i_{obj}$ is 0 degrees or more, the vertical angle is corrected as illustrated in Formula (4). Furthermore, in a case where the vertical angle elevation($i_{obj}$) is less than 0 degrees, the vertical angle is corrected as illustrated in Formula (5).

[Formula 4]

$$\text{if elevation}\ (i_{obj}) >= 0\text{: elevation}_{new}\ (i_{obj}) = \text{elevation}_{ref} + (\text{elevation}\ (i_{obj}) - \text{elevation}_{ref}) * \frac{\text{ratio}}{thre2} \quad (4)$$

[Formula 5]

$$\text{if elevation}\ (i_{obj}) < 0\text{: elevation}_{new}\ (i_{obj}) = -\text{elevation}_{ref} + (\text{elevation}\ (i_{obj}) + \text{elevation}_{ref}) * \frac{\text{ratio}}{thre2} \quad (5)$$

Note that, in Formulas (4) and (5), elevation($i_{obj}$) indicates the vertical angle before correction of the sound source of which the index is $i_{obj}$, that is, the vertical angle constituting the position information generated by the three-dimensional automatic arrangement technology in the position information generation unit 22.

Furthermore, $\text{elevation}_{new}(i_{obj})$ indicates the corrected vertical angle of the sound source of which the index is $i_{obj}$, that is, the vertical angle obtained by correcting the vertical angle elevation($i_{obj}$).

Moreover, in Formulas (4) and (5), $\text{elevation}_{ref}$ is a predetermined vertical angle such as 0 degrees, for example.

Regarding the sound source ratio, the smaller the value of the sound source ratio is, the smaller the number of sound source components included in the input audio signal is. From the feature F1 described above, the smaller the sound source ratio is, the more conspicuous the artificial noise included in the sound source signal is.

Therefore, in the correction of the horizontal angle of the position information indicated in Formulas (2) and (3), the feature F2 is used, and the horizontal angles of all the sound sources (objects) after the sound source separation are corrected to be closer to $azimuth_{ref}$ or $-azimuth_{ref}$ as the sound source ratio is smaller.

Similarly, in the correction of the vertical angle of the position information indicated in Formulas (4) and (5), the vertical angles of all the sound sources (objects) after the sound source separation are corrected to be closer to $elevation_{ref}$ or $-elevation_{ref}$ as the sound source ratio is smaller.

In particular, in Formulas (2) to (5), ratio/thre2, which is the ratio between the sound source ratio and the threshold value thre2, indicates how close the position of the sound source is to $azimuth_{ref}$, $-azimuth_{ref}$, $elevation_{ref}$, or $-elevation_{ref}$.

In a case where the position information of each sound source (object) is corrected in this manner, as a result, each sound source after sound source separation is arranged at a closer position in the three-dimensional space. Therefore, artificial noise caused by sound source separation is less likely to be perceived. In other words, artificial noise is reduced.

For example, it is assumed that each sound source is arranged at the position illustrated in FIG. 3 as a result of generating the position information by the three-dimensional automatic arrangement technology in the position information generation unit 22 for the eight sound source signals obtained by the sound source separation.

Figure 5:
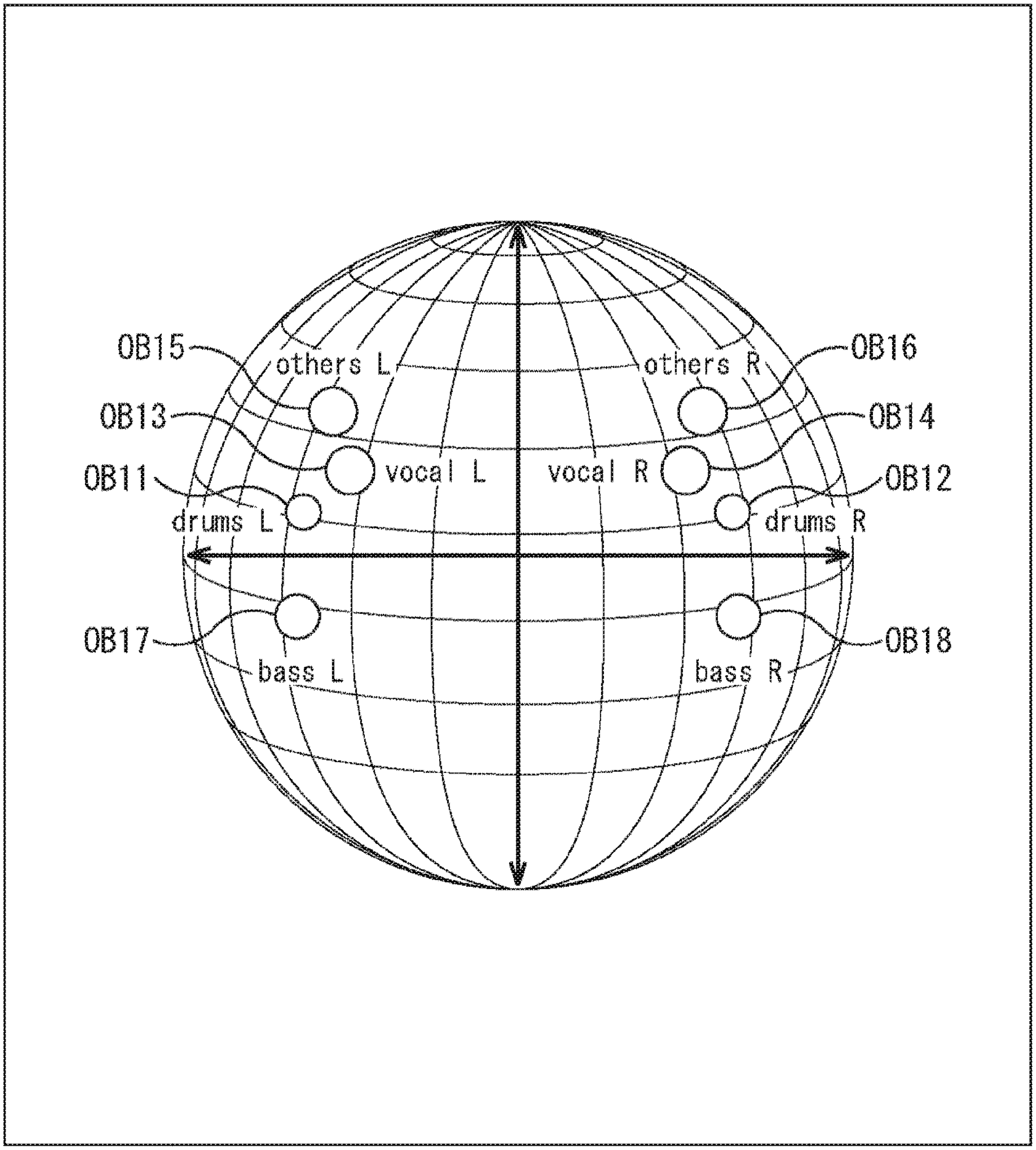
FIG. 5 is a diagram illustrating a sound source arrangement example in a three-dimensional space.

Then, in a case where the position information of the eight sound source signals is corrected by Formulas (2) to (5), the arrangement position of each sound source (object) is corrected as illustrated in FIG. 5, for example. Note that, in FIG. 5, portions corresponding to those in FIG. 3 are denoted by the same reference numerals, and the description thereof will be omitted as appropriate.

In the example illustrated in FIG. 5, similarly to the case in FIG. 3, the objects OB11 to OB18 of eight sound source signals are arranged in the three-dimensional space.

In a case of comparing the example in FIG. 3 with the example in FIG. 5, it can be seen that in the example in FIG. 5, the distance between the objects is shorter than that in the case in FIG. 3, and artificial noise is less likely to be perceived.

Specifically, in FIG. 3, for the objects positioned on the left side as viewed from the listener, that is, the objects of which the horizontal angle constituting the position information is 0 degrees or more, the position is corrected to approach a position where the horizontal angle and the vertical angle are $(azimuth_{ref}, elevation_{ref})=(30, 0)$.

As a result, in FIG. 5, the object OB11, the object OB13, the object OB15, and the object OB17 are close to a predetermined reference position $(azimuth_{ref}, elevation_{ref})=(30, 0)$, and it can be seen that artificial noise is reduced.

Similarly, in FIG. 3, for the objects positioned on the right side as viewed from the listener, that is, the objects of which the horizontal angle constituting the position information is less than 0 degrees, the position is corrected to approach a position where the horizontal angle and the vertical angle are $(-azimuth_{ref}, elevation_{ref})=(-30, 0)$.

As a result, in FIG. 5, the object OB12, the object OB14, the object OB16, and the object OB18 are close to a predetermined reference position $(-azimuth_{ref}, elevation_{ref})=(-30, 0)$, and it can be seen that artificial noise is reduced.

(Processing of Expanding Sound Image)

Next, the processing of expanding the sound image that is processing for improving the sound quality will be described.

Normally, in a case where a plurality of sound sources sounds in the same space, that is, in a case where sounds are output from a plurality of sound sources, since the sounds from the sound sources are reflected by a wall or a ceiling present in the space, a human (listener) in the space perceives the sounds coming from various front, back, left, right, upward and downward directions.

On the other hand, in the processing in the signal processing apparatus 11, that is, for example, in the processing of converting the input audio signal of the stereo sound source into the sound source signal of each sound source for 3D Audio reproduction, even in a case where the sound of each sound source is reproduced on the basis of the sound source signals, the sound of each sound source can be heard only from the direction in which each sound source is arranged. That is, the listener hears only the direct sound of each sound source, and cannot hear the reverberation sound (reflected sound).

Therefore, even in a case where the content is reproduced on the basis of each sound source signal, the sound cannot be heard by the listener as if the sound from the sound source is output in the same space, and the sound may be heard unnaturally without a realistic feeling. That is, in some cases, a sufficient realistic feeling cannot be obtained, and sound quality may deteriorate.

Therefore, for the purpose of suppressing such deterioration in sound quality, the processing of expanding the sound image is performed. In particular, here, two types of processing will be described as examples of the processing of expanding the sound image.

(Surround Reverb Processing)

First, the surround reverb processing will be described as a first example of the processing of expanding the sound image.

In performing the surround reverb processing, it is necessary to prepare an impulse response in advance.

For example, a measurement signal such as an impulse or a time stretched pulse (TSP) signal is reproduced from a plurality of predetermined reproduction positions in a predetermined three-dimensional space determined in advance, and the measurement signal is recorded (collected) at a plurality of impulse response measurement positions to obtain an impulse response.

In this case, the three-dimensional space in which the impulse response is measured is a space in which each sound source in the content is assumed to be present.

For example, assuming that the number of reproduction positions of the measurement signal at the time of measuring the impulse response is M and the number of impulse response measurement positions is N, (M x N) impulse responses are obtained for one three-dimensional space. Note that the number of three-dimensional spaces for preparing the impulse response may be one, or the impulse response may be prepared for each of a plurality of three-dimensional spaces.

Here, in a case where filtering processing is performed on the basis of the impulse response and the sound source signal assuming that the arrangement position of the sound source (object) is at a predetermined reproduction position and the impulse response measurement position is at the position of a virtual speaker corresponding to the reflection position of the sound from the sound source, a signal of a pseudo reverb (reverberation) component can be obtained.

In a case where (M x N) impulse responses are prepared for each three-dimensional space, the surround reverb processing is performed using these impulse responses.

That is, for example, in a case where one sound source signal as a processing target is selected, the reproduction position closest to the position indicated by the position information of the sound source signal as the processing target is searched for from among the M reproduction positions.

Then, N impulse responses prepared for the reproduction position obtained as a search result are read out, and filtering processing is performed on the basis of the sound source signal as the processing target and filter coefficients using the impulse responses as the filter coefficients.

Since the filtering processing is performed for each of N impulse responses, N audio signals are obtained as a result of the processing.

Each of the N audio signals obtained in this manner is a sound source signal of the reverb object corresponding to the reverb component, and the information indicating the impulse response measurement position of the corresponding impulse response is generated as the position information of the sound source signals.

Therefore, the sound source signals of the N reverb objects and the position information thereof are newly generated for the sound source signal of one object (sound source).

In the surround reverb processing, the above processing is performed for each sound source (sound source signal). Then, not only the sound source signals of the original sound sources but also the sound source signals of the reverb objects generated for the respective sound sources are output to the subsequent stage as the additionally generated sound source signals of the objects.

Therefore, for example, assuming that the number of sound source signals of the original sound source (object) is eight, basically, sound source signals and position information of a total of eight (N+1) objects are obtained by the surround reverb processing.

Note that, more specifically, the sound source signal of the reverb object generated by the surround reverb processing is subjected to gain adjustment (gain correction) with a predetermined gain value to be the final sound source signal of the reverb object. This is because by making the sound based on the sound source signal of the reverb object smaller than the sound based on the sound source signal of the original sound source, a more natural sound can be heard.

Furthermore, in a case where there is a plurality of reverb objects having different original sound sources but having the same position indicated by the position information, that is, the same impulse response measurement position, the sound source signals of the plurality of reverb objects are added together to be the sound source signal of one reverb object.

By performing the surround reverb processing as described above, the sound can be heard by the listener as if the sound comes from a plurality of different directions for one sound source, and the above-described unnatural sound hearing can be eliminated so that the sound quality can be improved. In other words, a higher realistic feeling can be obtained.

Moreover, by performing such surround reverb processing and adding the reverb component to the sound of the content, the above-described artificial noise can be also made inconspicuous, and the sound quality can be further improved.

Note that, in order to perform the surround reverb processing, (M×N) impulse responses prepared in advance for the three-dimensional space need to be held in the memory, but the number M of reproduction positions and the number N of impulse response measurement positions may be determined in any manner.

For example, in a case where the number M of reproduction positions or the number N of impulse response measurement positions is increased, the memory size required to hold the impulse response is increased. Furthermore, for example, in a case where the number N of impulse response measurement positions is increased, the number of reverb objects is increased accordingly, and thus the processing amount in the surround reverb processing and the subsequent stage thereof is increased.

Furthermore, the greater the gain value of the sound source signal of the reverb object, the higher the reverb effect. This gain value may be a fixed value for all objects (sound sources), for example, 0.05 or the like, or may be a different value for each object.

Moreover, whether or not to perform the surround reverb processing may be switched according to the instrument information of the object (sound source).

For example, in a case where the surround reverb processing is performed only on the sound source signal of the sound source of the instrument information "vocal" which is the main sound source component of the content, it is possible to suppress the processing amount to be small while improving the sound quality as a whole.

Figure 6:
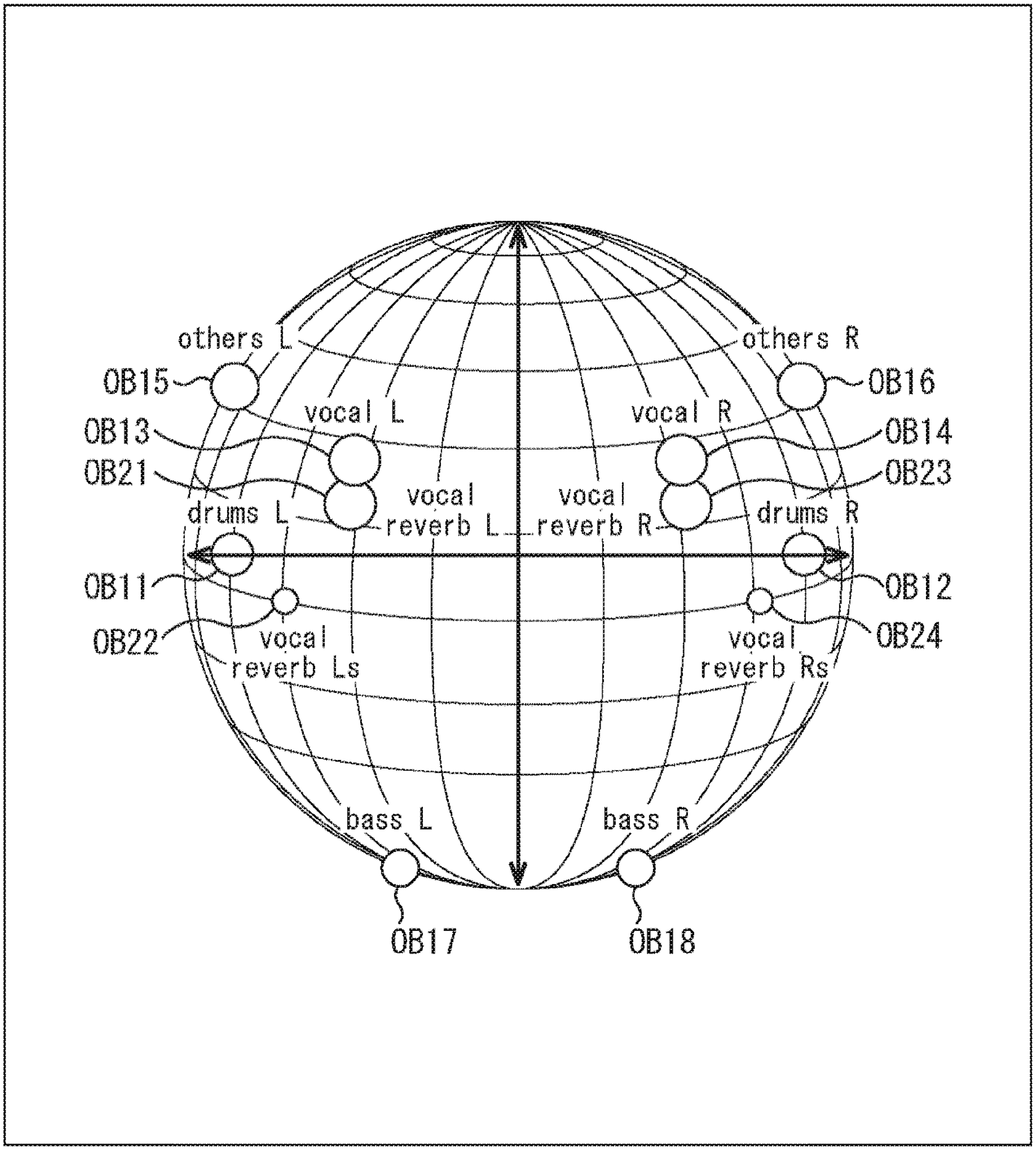
FIG. 6 is a diagram illustrating a sound source arrangement example in a three-dimensional space.

In this case, for example, in a case where the surround reverb processing is performed only on the sound source signal of the instrument information "vocal" among the respective sound source signals of the sound source arrangement illustrated in FIG. 3, a new reverb object is generated as illustrated in FIG. 6, for example. Note that, in FIG. 6, portions corresponding to those in FIG. 3 are denoted by the same reference numerals, and the description thereof will be omitted as appropriate.

In the example of FIG. 6, the arrangement positions of the original objects OB11 to OB18 are the same as those in the example illustrated in FIG. 3.

In FIG. 6, in addition to these original objects, objects OB21 to OB24 which are reverb objects are further generated.

That is, the objects OB21 to OB24 which are reverb objects are generated for the object OB13 of the L channel of the instrument information "vocal" and the object OB14 of the R channel of the instrument information "vocal".

In particular, each of the objects OB21 to OB24 includes a component of a sound source signal corresponding to the object OB13 and a component of a sound source signal corresponding to the object OB14.

In this manner, the object OB21, the object OB22, and the like that are reverb objects are generated for one object such as the object OB13 and the object OB14.

In this manner, the sound from the original sound source arrives at the listener from a plurality of directions, and as a result, the sound image of the sound from the sound source spreads. That is, it can be said that the surround reverb processing is the processing of expanding the sound image.

By the surround reverb processing as described above, it is possible to expand the sound image of the original sound source and improve the sound quality.

(Spread Processing)

Next, spread processing will be described as a second example of the processing of expanding the sound image.

The spread processing described below can improve the sound quality with a smaller processing amount than the case of performing the surround reverb processing.

The spread processing is the processing of expanding the sound image by generating position information of a spread component using a parameter (information) called spread and performing rendering processing such as vector base amplitude panning (VBAP) so that the sound image is also localized at a position indicated by the position information.

Note that the spread processing is described in detail in, for example, "ISO/IEC 23008-3, MPEG-H 3D Audio", "ISO/IEC 23008-3: 2015/AMENDMENT3, MPEG-H 3D Audio Phase 2", or the like.

By performing such spread processing, the sound image of each sound source can be expanded, and the above-described unnatural sound hearing can be eliminated so that the sound quality can be improved. In other words, a higher realistic feeling can be obtained. Moreover, the artificial noise described above can be made inconspicuous, and the sound quality can be further improved.

Here, the spread processing will be described.

The spread indicating the degree of spread of the sound image is, for example, angle information indicating an arbitrary angle from 0 degrees to 180 degrees, and the rendering processing is performed using such spread.

For example, in a case where the spread is given to one sound source signal, a region (hereinafter, also referred to as a sound image region) such as a circle or an ellipse centered on the position indicated by the position information of the sound source signal is determined. Here, the angle formed by the vector from the position of the listener to the center of the sound image region and the vector from the position of the listener to the end of the sound image region is defined as an angle indicated by the spread.

Next, a vector from the position of the listener to each of a plurality of predetermined positions in the sound image region including a vector from the position of the listener to the center of the sound image region is defined as a spread vector.

Furthermore, for each of the plurality of spread vectors obtained in this manner, a gain value of each of the plurality of speakers, that is, a VBAP gain is calculated by VBAP such that the sound image is localized at a position indicated by the spread vector.

Then, the VBAP gain for each position indicated by the plurality of spread vectors calculated for the same speaker is added, and the VBAP gain after the addition is normalized to be a final VBAP gain.

In a case where the VBAP gain is obtained for each speaker, the VBAP gain obtained for the speaker is multiplied by the audio signal of the object, that is, the sound source signal of the object (sound source) here, and the audio signal obtained as a result is defined as the audio signal of the channel corresponding to the speaker.

In a case where sounds are output from the respective speakers on the basis of the audio signals of the respective speakers obtained in this manner, the sound of the object is reproduced such that the sound of the object (sound source) is localized in the entire sound image region described above. That is, the sound of the object spreads over the entire sound image region and is localized.

In the spread processing as described above, the greater the value of spread, the larger the spread effect, that is, the degree of spread of the sound image.

In a case where the spread processing is performed at the subsequent stage of the signal processing apparatus 11, for example, it is only required to automatically assign spread in the signal processing apparatus 11.

In this case, the value of spread assigned to each object (sound source signal) may be a fixed value such as 30 degrees, for example, for all objects, or may be a different value for each object.

For example, in a case where a different spread is assigned for each object, the value of the spread may be determined on the basis of the instrument information, the sound pressure of the sound source signal, the priority information, the reverberation information, the acoustic information, or the like, such as a value determined in advance for the sound source type indicated by the instrument information.

Furthermore, whether or not to perform the spread processing for each object (sound source) may be switched on the basis of the instrument information or the like.

Moreover, the spread processing is not limited to the processing described above, and may be processing of simply copying (duplicating) and adding an object, or the like.

Here, as an example, the processing of expanding the sound image by copying an object (sound source) of the instrument information "others" will be described.

In such a case, for the object of which the instrument information is other than "others", a new object for expanding the sound image is not generated.

On the other hand, for the object of which the instrument information is "others", the sound source signal of the object (sound source) is used as the sound source signal of one or a plurality of new objects as it is, and the position information is assigned to the new objects.

At this time, the position information of the new object is, for example, obtained by adding a predetermined value to the horizontal angle or the vertical angle of the position information of the object of the original instrument information "others".

Note that the sound source signal of the newly generated object for expanding the sound image may be the sound source signal of the object of the original instrument information "others", or may be obtained by performing gain adjustment on the sound source signal of the object of the instrument information "others".

Figure 7:
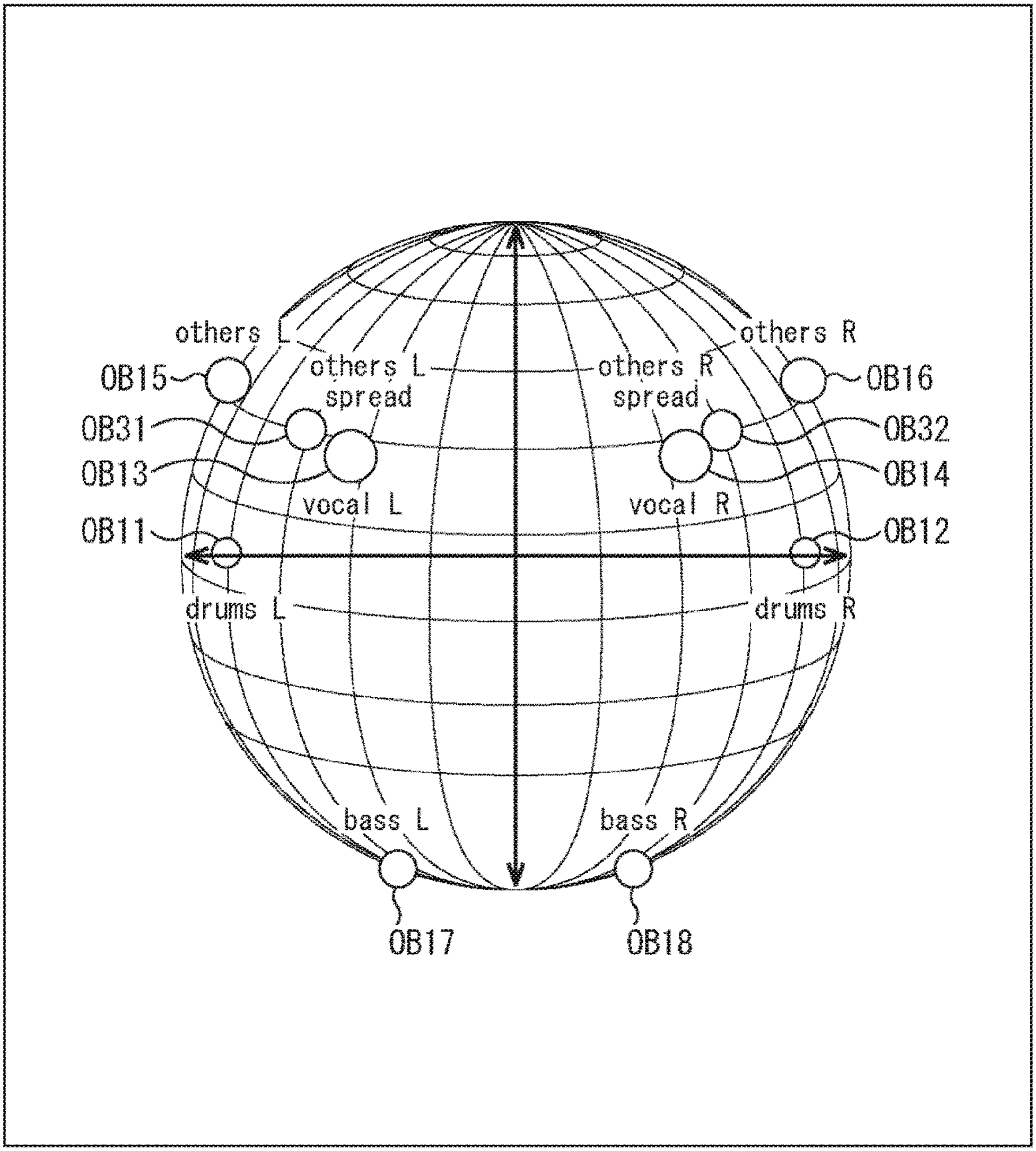
FIG. 7 is a diagram illustrating a sound source arrangement example in a three-dimensional space.

Furthermore, in a case where the processing of expanding the sound image by copying the object is performed only on the sound source signal of the instrument information "others" among the respective sound source signals of the sound source arrangement illustrated in FIG. 3, for example, a new additional object is generated as illustrated in FIG. 7. Note that, in FIG. 7, portions corresponding to those in FIG. 3 are denoted by the same reference numerals, and the description thereof will be omitted as appropriate.

In the example of FIG. 7, the arrangement positions of the original objects OB11 to OB18 are the same as those in the example illustrated in FIG. 3.

In FIG. 7, in addition to the original objects, new objects OB31 and OB32 for expanding the sound image are further generated.

That is, the object OB31 is generated for the object OB15 of the L channel of the instrument information "others", and similarly, the object OB32 is generated for the object OB16 of the R channel of the instrument information "others".

In this example, the object OB31 is arranged in the vicinity of the object OB15, and the sound of the object OB15 is heard by the listener from the arrangement position of the object OB15 and the arrangement position of the object OB31. That is, the sound image of the sound of the object OB15 is expanded and heard.

Similarly to the case of the object OB31, the object OB32 is also arranged in the vicinity of the object OB16, and the sound image of the sound of the object OB16 is expanded and heard.

For example, in a case where the processing of expanding the sound image is performed on a sound source having a large surface area or a sound source of the instrument such as a violin, a higher realistic feeling can be obtained. Therefore, in a case where the processing of expanding the sound image is selectively performed on the sound source signal of such a specific sound source, the sound quality can be improved while suppressing the processing amount as a whole.

Configuration Example of Signal Processing Apparatus

Note that the reduction processing of artificial noise, the surround reverb processing, and the spread processing described above may be performed in combination.

For example, any two or more types of processing among the reduction processing of artificial noise, the surround reverb processing, and the spread processing can be performed in combination.

Here, a case where the reduction processing of artificial noise and the processing of expanding the sound image are performed in combination in the signal processing apparatus 11 will be specifically described.

Figure 8:
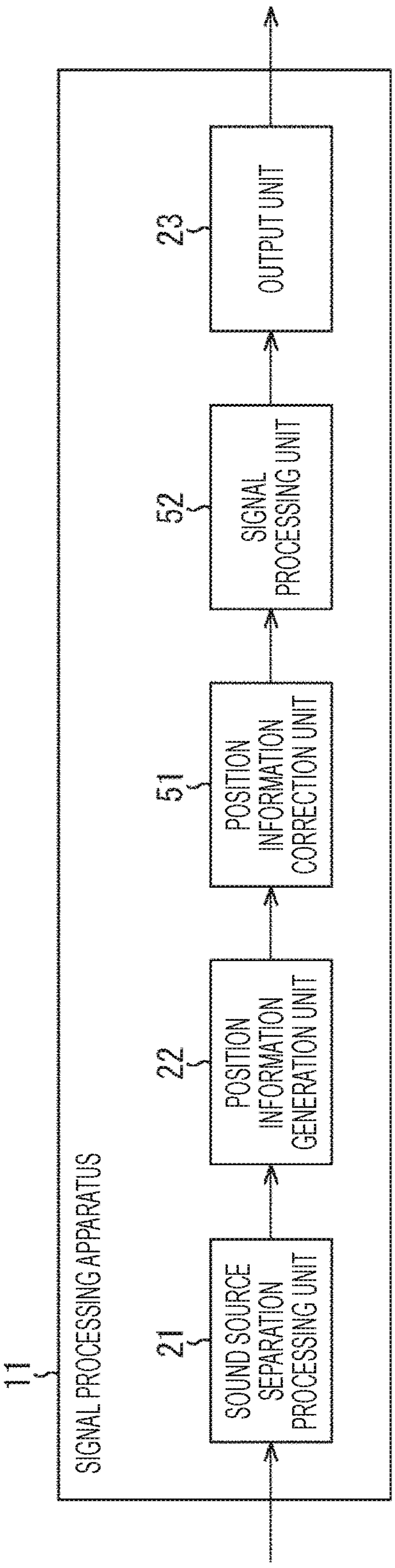
FIG. 8 is a diagram illustrating a configuration example of a signal processing apparatus.

In such a case, the signal processing apparatus 11 is configured as illustrated in FIG. 8, for example. Note that, in FIG. 8, portions corresponding to those in FIG. 1 are denoted by the same reference numerals, and the description thereof will be omitted as appropriate.

The signal processing apparatus 11 illustrated in FIG. 8 includes the sound source separation processing unit 21, the position information generation unit 22, a position information correction unit 51, a signal processing unit 52, and the output unit 23.

The configuration of the signal processing apparatus 11 illustrated in FIG. 8 is different from that of the signal processing apparatus 11 in FIG. 1 in that the position information correction unit 51 and the signal processing unit 52 are newly provided between the position information generation unit 22 and the output unit 23, and is the same as that of the signal processing apparatus 11 in FIG. 1 in other points.

The position information correction unit 51 performs the reduction processing of artificial noise described above on the basis of the sound source signal and the position information for each sound source (object) supplied from the position information generation unit 22, and corrects the position information of each sound source as necessary.

The position information correction unit 51 supplies the position information of each sound source corrected as necessary and the sound source signal to the signal processing unit 52.

The signal processing unit 52 performs the processing of expanding the sound image described above on the basis of the sound source signal and the position information of each sound source supplied from the position information correction unit 51, and supplies the sound source signal and the position information of each sound source obtained as a result to the output unit 23.

For example, in the signal processing unit 52, at least one of the surround reverb processing or the processing of generating spread for the spread processing described above is performed as the processing of expanding the sound image.

For example, in a case where the surround reverb processing is performed, the sound source signal and the position information of the new object (sound source) corresponding to the reverb object are generated, and in a case where the processing of generating spread is performed, the generated spread is assigned to the position information of each sound source.

The output unit 23 generates and outputs the object data on the basis of the sound source signal and the position information supplied from the signal processing unit 52.

Description of Object Data Generation Processing

Next, the object data generation processing in a case where the signal processing apparatus 11 has the configuration illustrated in FIG. 8 will be described.

Figure 9:
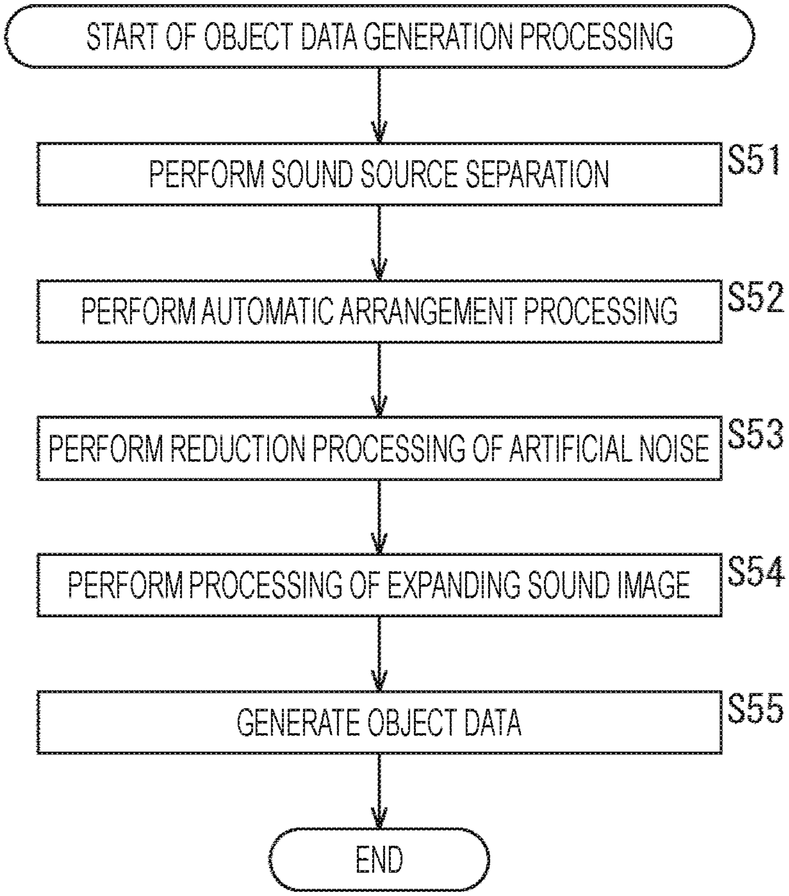
FIG. 9 is a flowchart for describing object data generation processing.

That is, hereinafter, the object data generation processing by the signal processing apparatus 11 illustrated in FIG. 8 will be described with reference to the flowchart of FIG. 9.

Figure 4:
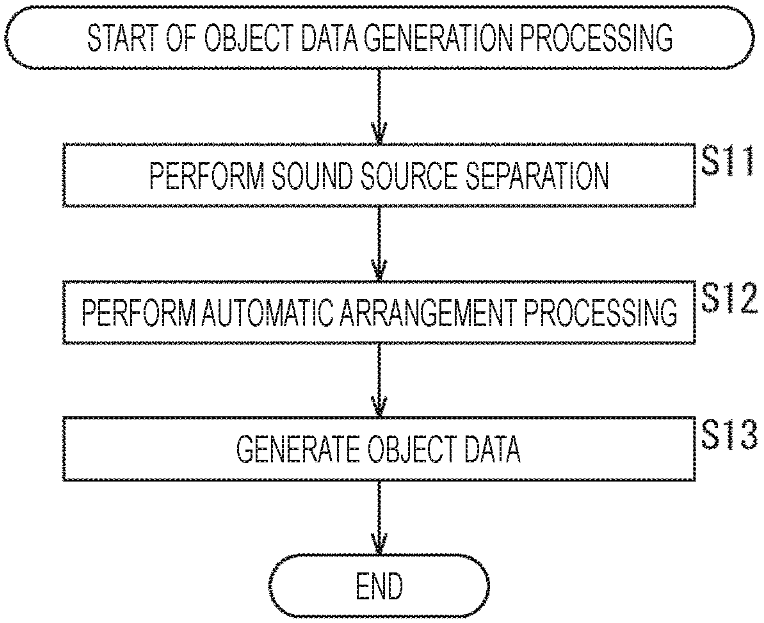
FIG. 4 is a flowchart for describing object data generation processing.

Note that the processing in steps S51 and S52 is similar to the processing in steps S11 and S12 in FIG. 4, and thus the description thereof will be omitted. However, in step S52, the position information generation unit 22 supplies the sound source signal and the position information of each sound source obtained by the automatic arrangement processing to the position information correction unit 51.

In step S53, the position information correction unit 51 performs the reduction processing of artificial noise on the basis of the sound source signal and the position information of each sound source supplied from the position information generation unit 22.

That is, the position information correction unit 51 calculates the sound pressure level($i_{obj}$) of each sound source signal by calculating the above-described Formula (1), compares the sound pressure level($i_{obj}$) of each sound source signal with the threshold value thre1, and obtains the sound source ratio ratio on the basis of the comparison result.

Then, the position information correction unit 51 does not correct the position information in a case where the sound source ratio is greater than the threshold value thre2, and corrects the horizontal angle and the vertical angle in the position information of each sound source by the above-described Formulas (2) to (5) in a case where the sound source ratio is equal to or less than the threshold value thre2.

In a case where the position information of each sound source is corrected as necessary, the position information correction unit 51 supplies the sound source signal and the position information of each sound source to the signal processing unit 52.

In step S54, the signal processing unit 52 performs the processing of expanding the sound image on the basis of the sound source signal and the position information of each sound source supplied from the position information correction unit 51, and supplies the sound source signal and the position information of each sound source obtained as a result to the output unit 23.

For example, in a case where the surround reverb processing is performed as the processing of expanding the sound image, the signal processing unit 52 sequentially selects each sound source as the sound source that is the processing target.

Then, the signal processing unit 52 searches for the reproduction position closest to the position indicated by the position information of the sound source as the processing target from among the M reproduction positions on the basis of the position information of the sound source as the processing target, and reads N impulse responses regarding the reproduction position obtained as the search result from the memory.

Moreover, the signal processing unit 52 generates sound source signals and position information of N new sound sources by performing filtering processing and gain adjustment for each of the N impulse responses on the basis of each of the sound source signal of the sound source as the processing target and the read N impulse responses.

In a case where all the sound sources are used as the sound source as the processing target and the sound source signal and the position information of the new sound source are generated, the signal processing unit 52 adds the sound source signals having the same position information among the new sound sources to obtain the sound source signal of one sound source.

By such surround reverb processing, in addition to the sound source signal and the position information of the original sound source, the sound source signal and the position information of the new sound source corresponding to the reverb object can be obtained.

Furthermore, in a case where the processing of generating spread is performed as the processing of expanding the sound image, the signal processing unit 52 generates the spread of each sound source using the sound source signal and the position information as necessary, and supplies the generated spread to the output unit 23 together with the sound source signal and the position information.

In step S55, the output unit 23 generates and outputs the object data on the basis of the sound source signal and the position information supplied from the signal processing unit 52. In step S55, processing similar to that in step S13 in FIG. 4 is performed.

Note that, in a case where the spread of each sound source is supplied from the signal processing unit 52, the output unit 23 generates metadata including the spread and position information of each sound source. Furthermore, the metadata may include the instrument information, the channel information, and the like.

In a case where the object data is generated in this manner, the output unit 23 outputs the generated object data to the subsequent stage, and the object data generation processing is ended.

As described above, in a case where the object data is generated, the signal processing apparatus 11 appropriately performs the reduction processing of artificial noise and the processing of expanding the sound image. In this manner, the artificial noise can be reduced, the sound image can be expanded, and the sound quality can be further improved.

Modification Example of Second Embodiment

Configuration Example of Signal Processing Apparatus

Moreover, the signal processing apparatus 11 described above may be a device on the encoding side such as a server that functions as an encoding device, or may be a device on the decoding side such as a headphone, a personal computer, a portable player, or a smartphone.

Figure 10:
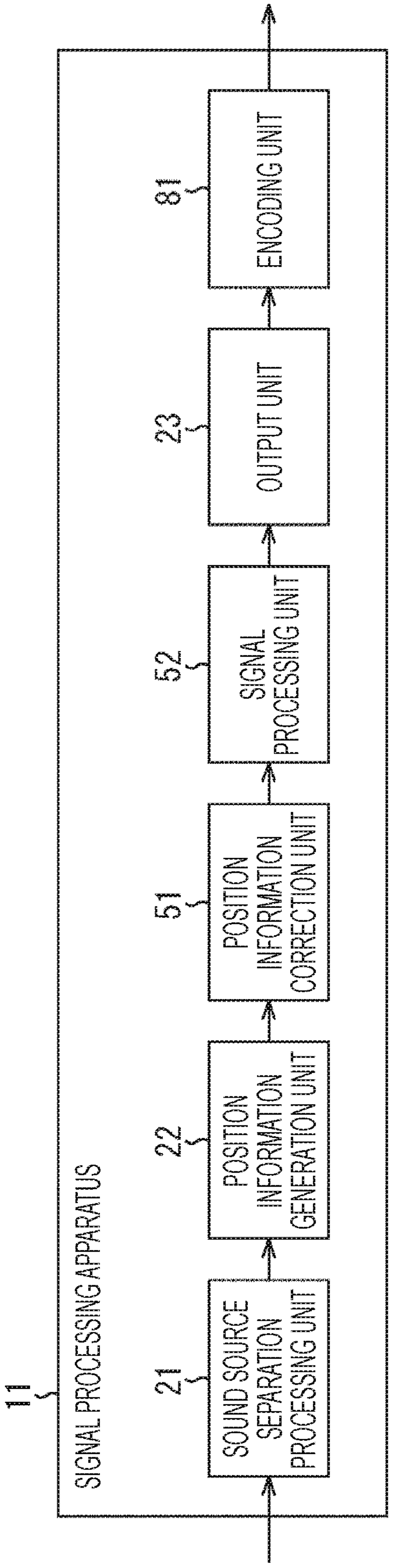
FIG. 10 is a diagram illustrating a configuration example of a signal processing apparatus.

For example, in a case where the signal processing apparatus 11 is a device on the encoding side, the signal processing apparatus 11 has a configuration illustrated in FIG. 10. Note that, in FIG. 10, portions corresponding to those in FIG. 8 are denoted by the same reference numerals, and the description thereof will be omitted as appropriate.

The signal processing apparatus 11 illustrated in FIG. 10 includes the sound source separation processing unit 21, the information correction unit 51, the signal processing unit 52, the output unit 23, and an encoding unit 81.

The configuration of the signal processing apparatus 11 illustrated in FIG. 10 is different from that of the signal processing apparatus 11 in FIG. 8 in that the encoding unit 81 is newly provided at the subsequent stage of the output unit 23, and is the same as that of the signal processing apparatus 11 in FIG. 8 in other points.

The encoding unit 81 encodes the object data supplied from the output unit 23 to generate an encoded bit stream, and transmits the encoded bit stream to a device such as a client.

For example, the encoded bit stream includes encoded audio data obtained by encoding the sound source signal of each object constituting the object data, and encoded metadata obtained by encoding the metadata of each object constituting the object data.

Figure 11:
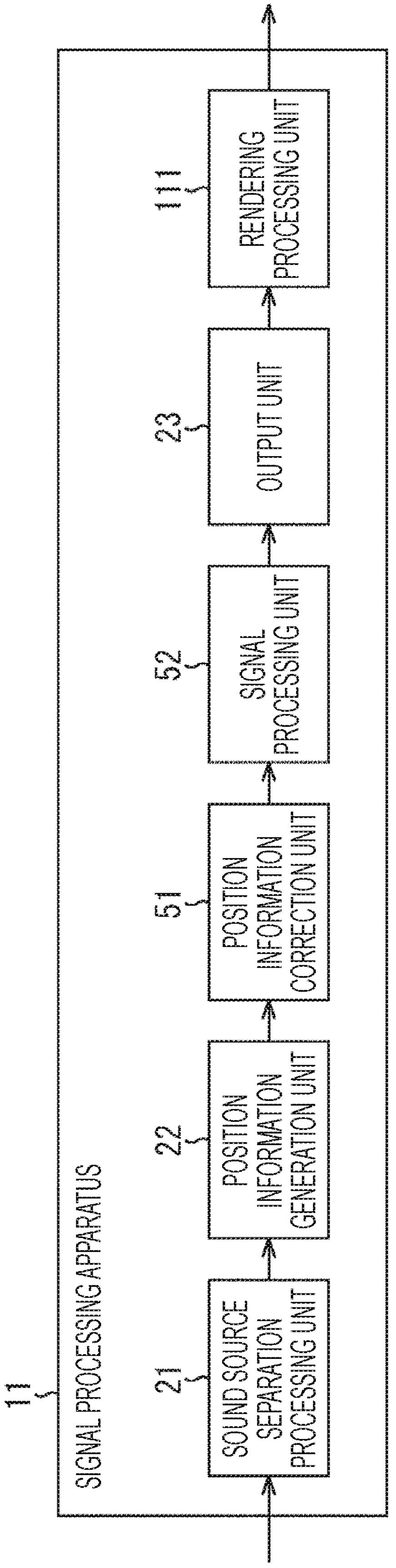
FIG. 11 is a diagram illustrating a configuration example of a signal processing apparatus.

Furthermore, in a case where the signal processing apparatus 11 is a device on the decoding side, the signal processing apparatus 11 has a configuration illustrated in FIG. 11, for example. Note that, in FIG. 11, portions corresponding to those in FIG. 8 are denoted by the same reference numerals, and the description thereof will be omitted as appropriate.

The signal processing apparatus 11 illustrated in FIG. 11 includes the sound source separation processing unit 21, the information correction unit 51, the signal processing unit 52, the output unit 23, and a rendering processing unit 111.

The configuration of the signal processing apparatus 11 illustrated in FIG. 11 is different from that of the signal processing apparatus 11 in FIG. 8 in that the rendering processing unit 111 is newly provided at the subsequent stage of the output unit 23, and is the same as that of the signal processing apparatus 11 in FIG. 8 in other points.

The rendering processing unit 111 performs rendering processing such as VBAP on the basis of the sound source signal and the metadata of each object as the object data supplied from the output unit 23, and generates a stereo or multi-channel reproduction audio signal for reproducing the sound of the content, that is, the sound of each object.

Here, for example, in a case where spread is included in the metadata of the object, the rendering processing unit 111 performs the spread processing described above as the rendering processing, and generates the reproduction audio signal.

Configuration Example of Computer

Meanwhile, the above-described series of processing can be executed by hardware, and can also be executed by software. In a case where the series of processing is executed by software, a program constituting the software is installed in a computer. Here, the computer includes a computer incorporated in dedicated hardware, a general-purpose personal computer capable of executing various functions by installing various programs, and the like, for example.

Figure 12:
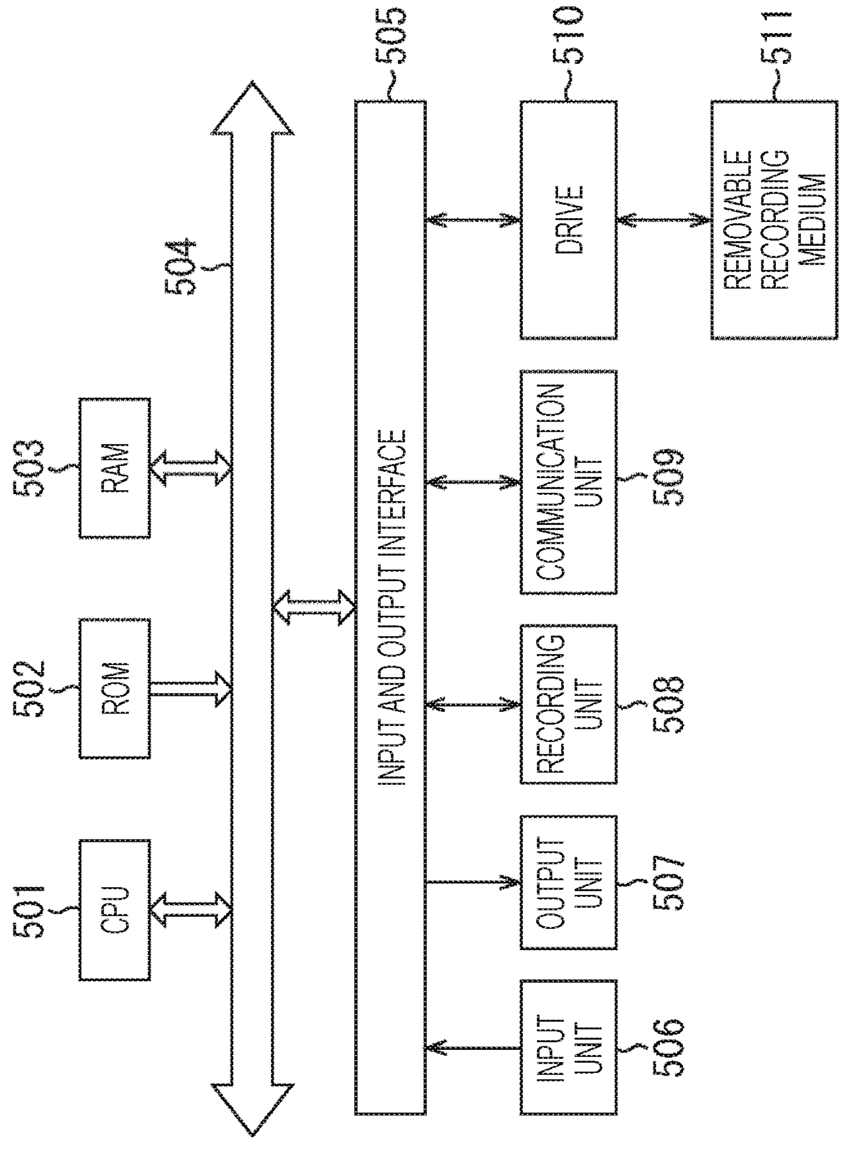
FIG. 12 is a diagram illustrating a configuration example of a computer.

FIG. 12 is a block diagram illustrating a configuration example of hardware of the computer that executes the above-described series of processing by a program.

In the computer, a central processing unit (CPU) 501, a read only memory (ROM) 502, and a random access memory (RAM) 503 are mutually connected by a bus 504.

Moreover, an input and output interface 505 is connected to the bus 504. An input unit 506, an output unit 507, a recording unit 508, a communication unit 509, and a drive 510 are connected to the input and output interface 505.

The input unit 506 includes a keyboard, a mouse, a microphone, an imaging element, and the like. The output unit 507 includes a display, a speaker, and the like. The recording unit 508 includes a hard disk, a nonvolatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, for example, the CPU 501 loads a program stored in the recording unit 508 into the RAM 503 via the input and output interface 505 and the bus 504 and executes the program, and thereby the above-described series of processing is performed.

The program executed by the computer (CPU 501) can be provided by being recorded in the removable recording medium 511 as a package medium or the like, for example. Furthermore, the program can be provided via a wired or wireless transmission medium such as a local area network, the Internet, or digital satellite broadcasting.

In the computer, the program can be installed in the recording unit 508 via the input and output interface 505 by mounting the removable recording medium 511 to the drive 510. Furthermore, the program can be installed in the recording unit 508 by being received by the communication unit 509 via a wired or wireless transmission medium. In addition, the program can be installed in the ROM 502 or the recording unit 508 in advance.

Note that the program executed by the computer may be a program in which processing is performed in time series in the order described in the present specification, or may be a program in which processing is performed in parallel or at necessary timing such as when a call is made.

Furthermore, the embodiments of the present technology are not limited to the above-described embodiments, and various modifications can be made without departing from the gist of the present technology.

For example, the present technology can have a configuration of cloud computing in which one function is shared and processed in cooperation by a plurality of devices via a network.

Furthermore, each step described in the above-described flowcharts can be executed by one device or can be shared and executed by a plurality of devices.

Moreover, in a case where a plurality of kinds of processing is included in one step, the plurality of kinds of processing included in the one step can be executed by one device or can be shared and executed by a plurality of devices.

Moreover, the present technology can have the following configurations.

(1)

A signal processing apparatus including:

a sound source separation unit that extracts, from an input audio signal including a plurality of sound source signals, one or a plurality of the sound source signals by sound source separation;

a position information generation unit that generates position information of the extracted sound source signal on the basis of a result of the sound source separation; and an output unit that outputs the extracted sound source signal and the position information as data of an audio object.

(2)

The signal processing apparatus described in (1), in which the position information generation unit generates the position information on the basis of a sound source type of the sound source signal obtained by the sound source separation.

(3)

The signal processing apparatus described in (1) or (2), in which the position information generation unit generates the position information on the basis of channel information of the sound source signal obtained by the sound source separation.

(4)

The signal processing apparatus described in any one of (1) to (3), in which the position information generation unit generates the position information on the basis of the sound source signal obtained by the sound source separation.

(5)

The signal processing apparatus described in any one of (1) to (4), in which the position information generation unit generates the position information on the basis of a decision tree model or a neural network.

(6)

The signal processing apparatus described in (5), in which the position information generation unit generates the position information on the basis of the decision tree model or the neural network learned for each sound source type.

(7)

The signal processing apparatus described in any one of (1) to (6), further including:

a position information correction unit that corrects the position information on the basis of a number of the sound source signals extracted from the input audio signal and a sound pressure of the sound source signal.

(8)

The signal processing apparatus described in any one of (1) to (7), further including:

a signal processing unit that performs surround reverb processing on the basis of the sound source signal and the position information to generate new sound source signal and position information.

(9)

The signal processing apparatus described in any one of (1) to (8), further including:

a signal processing unit that generates a parameter for spread processing on the sound source signal obtained by the sound source separation.

(10)

The signal processing apparatus described in any one of (1) to (9), in which the sound source signal is a stereo audio signal, and the output unit sets each of the sound source signal of an L channel and the sound source signal of an R channel of stereo obtained by the sound source separation, as the sound source signal of one object.

(11)

The signal processing apparatus described in any one of (1) to (10), further including:

an encoding unit that encodes the data.

(12)

The signal processing apparatus described in any one of (1) to (10), further including:

a rendering processing unit that performs rendering processing on the basis of the data.

(13)

The signal processing apparatus described in any one of (1) to (12), in which the position information generation unit generates the position information using a different method for each sound source type.

(14)

A signal processing method including:

by a signal processing apparatus, extracting, from an input audio signal including a plurality of sound source signals, one or a plurality of the sound source signals by sound source separation;

generating position information of the extracted sound source signal on the basis of a result of the sound source separation; and outputting the extracted sound source signal and the position information as data of an audio object.

(15)

A program causing a computer to execute processing including steps including:

extracting, from an input audio signal including a plurality of sound source signals, one or a plurality of the sound source signals by sound source separation;

generating position information of the extracted sound source signal on the basis of a result of the sound source separation; and outputting the extracted sound source signal and the position information as data of an audio object.

REFERENCE SIGNS LIST

11 Signal processing apparatus
21 Sound source separation processing unit
22 Position information generation unit
23 Output unit
51 Position information correction unit
52 Signal processing unit
81 Encoding unit
111 Rendering processing unit

The invention claimed is:

1. A signal processing apparatus, comprising:

a sound source separation unit configured to extract one or more sound source signals from an input audio signal based on sound source separation;

a position information generation unit configured to generate position information of a sound source signal of the one or more sound source signals based on a result of the sound source separation;

a position information correction unit configured to:

calculate a sound pressure of a plurality of sound pressures of the sound source signal of the one or more sound source signals; and correct the position information of the sound source signal based on a number of the one or more sound source signals and the sound pressure of the sound source signal; and an output unit configured to output an audio object, wherein data of the audio object includes the sound source signal and the corrected position information of the sound source signal.

2. The signal processing apparatus according to claim 1, wherein the position information generation unit is further configured to generate the position information of the sound source signal of the one or more sound source signals based on a sound source type of the sound source signal.

3. The signal processing apparatus according to claim 1, wherein the position information generation unit is further configured to generate the position information of the sound source signal of the one or more sound source signals based on channel information of the sound source signal.

4. The signal processing apparatus according to claim 1, wherein the position information generation unit is further configured to generate the position information of the sound source signal of the one or more sound source signals based on the sound source signal.

5. The signal processing apparatus according to claim 1, wherein the position information generation unit is further configured to generate the position information of the sound source signal of the one or more sound source signals based on one of a decision tree model or a neural network.

6. The signal processing apparatus according to claim 5, wherein the position information generation unit is further configured to generate the position information of the sound source signal of the one or more sound source signals based on one of the decision tree model or the neural network learned for at least one sound source type associated with the sound source signal.

7. The signal processing apparatus according to claim 1, further comprising: a signal processing unit configured to:

perform surround reverb process based on the sound source signal and the corrected position information of the sound source signal; and generate a new sound source signal and a new position information based on the performed surround reverb process.

8. The signal processing apparatus according to claim 1, further comprising: a signal processing unit configured to generate a parameter for spread process on the sound source signal.

9. The signal processing apparatus according to claim 1, wherein the one or more sound source signals corresponds to one or more stereo audio signals, and the output unit is further configured to:

set a first sound source signal of the one or more sound source signals as a first audio object, wherein the first sound source signal is associated with an L channel of a stereo; and set a second sound source signal of the one or more sound source signals as a second audio object, wherein the second sound source signal is associated with an R channel of the stereo.

10. The signal processing apparatus according to claim 1, further comprising: an encoding unit configured to encode the data of the audio object.

11. The signal processing apparatus according to claim 1, further comprising a rendering processing unit configured to perform rendering process based on the data of the audio object.

12. The signal processing apparatus according to claim 1, wherein the position information generation unit is further configured to generate the position information of the sound source signal of the one or more sound source signals based on a method that corresponds to a sound source type of a plurality of source types associated with the sound source signal, the method is included in a plurality of methods, and each method of the plurality of methods is different.

13. A signal processing method comprising:

by a signal processing apparatus, extracting one or more sound source signals from an input audio signal based on sound source separation;

generating position information of a sound source signal of the one or more sound source signals based on result of the sound source separation;

calculating a sound pressure of a plurality of sound pressures of the sound source signal of the one or more sound source signals;

correcting the position information of the sound source signal based on a number of the one or more sound source signals and the sound pressure of the sound source signal; and outputting an audio object, wherein data of the audio object includes the sound source signal and the corrected position information of the sound source signal.

14. A non-transitory computer-readable medium having stored thereon, computer-executable instructions which, when executed by a computer, cause the computer to execute operations, the operations comprising:

extracting one or more sound source signals from an input audio signal based on sound source separation;

generating position information of a sound source signal of the one or more the sound source signals based on a result of the sound source separation;

calculating a sound pressure of a plurality of sound pressures of the sound source signal of the one or more sound source signals;

correcting the position information of the sound source signal based on a number of the one or more sound source signals and the sound pressure of the sound source signal; and outputting an audio object, wherein data of the audio object includes the sound source signal and the corrected position information of the sound source signal.

* * * * *